United States Patent
Boon

(10) Patent No.: US 7,640,490 B2
(45) Date of Patent: Dec. 29, 2009

(54) METHOD, SYSTEM, AND COMPUTER-READABLE MEDIUM FOR CONTROLLING THE CALCULATION OF VOLATILE FUNCTIONS IN A SPREADSHEET

(75) Inventor: Sean M. Boon, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 11/019,058

(22) Filed: Dec. 20, 2004

(65) Prior Publication Data
US 2006/0136534 A1 Jun. 22, 2006

(51) Int. Cl.
G06F 17/00 (2006.01)
(52) U.S. Cl. ...................................................... 715/219
(58) Field of Classification Search ................. 715/212, 715/213, 217, 219, 220
See application file for complete search history.

(56) References Cited

U.S. PATENT DOCUMENTS

| | | | | |
|---|---|---|---|---|
| 5,038,318 | A * | 8/1991 | Roseman | 712/30 |
| 5,893,123 | A * | 4/1999 | Tuinenga | 715/209 |
| 5,926,822 | A * | 7/1999 | Garman | 715/201 |
| 6,055,548 | A * | 4/2000 | Comer et al. | 715/212 |
| 6,981,048 | B1 * | 12/2005 | Abdolbaghian et al. | 709/228 |
| 2001/0056440 | A1* | 12/2001 | Abramson et al. | 707/504 |
| 2004/0111666 | A1* | 6/2004 | Hollcraft | 715/503 |
| 2005/0149482 | A1* | 7/2005 | Dillon | 707/1 |
| 2006/0129929 | A1* | 6/2006 | Weber et al. | 715/538 |
| 2007/0061698 | A1* | 3/2007 | Megiddo et al. | 715/503 |

OTHER PUBLICATIONS

Sestof, Implementing Function Spreadsheets, ACM 2008, pp. 91-100.*
Hyvonen et al., A New Basis for Spreadsheet Computing: Interval Solver for Microsoft Excel, Google 1999, pp. 1-8.*
Erwig et al. Autoamtic Generation and Maintenance of Correct Spreadsheets, ACM 2005, pp. 136-145.*
Choi et al., Orchestrating Computations on the World-Wide Web, Google 2004, pp. 1-20.*

* cited by examiner

*Primary Examiner*—Cong-Lac Huynh
(74) *Attorney, Agent, or Firm*—Merchant & Gould, P.C.

(57) ABSTRACT

A method, system, and computer-readable medium are provided for controlling the calculation of volatile functions in a workbook created in a spreadsheet application program such that the volatile function does not need to be recalculated each time a calculation request is received in the workbook. A volatile function may include a function which is capable of returning a different value each time the function is calculated. The spreadsheet application program determines a calculation mode setting for the workbook, calculates a volatile function timeout value based on the calculation mode setting, and calculates the volatile function based on the volatile function timeout value. The volatile function timeout value may include a time span for which the results of a volatile function are valid. The volatile function timeout value is calculated by determining the maximum of a workbook timeout value assigned to the workbook on a client computer and a server timeout value assigned to the workbook on a server computer running the spreadsheet application program. During the volatile function timeout period, the volatile functions are not recalculated.

20 Claims, 5 Drawing Sheets

| Function | Client Returns | Server Returns |
|---|---|---|
| Now | The date/time on the client | The date/time on the server in the server's time zone. |
| Rand | Random number | Random number |
| TODAY | Returns the date | Date on the server |
| Offset | Returns a reference to a range that is a specified number of rows and columns from a cell or range of cells. | Returns a reference to a range that is a specified number of rows and columns from a cell or range of cells. |
| Cell | Returns information about the formatting, location, or contents of the upper-left cell in a reference. | Returns information about the formatting, location, or contents of the upper-left cell in a reference. |
| INDIRECT | Returns the reference specified by a text string. | |
| INFO | Returns information about the current operating environment. | Returns information about the current operating environment. |
| Randbetween | Random number between arguments specified | Random number between arguments specified |
| INDEX | | |
| Rows | Returns the number of rows in a reference | Returns the number of rows in a reference |
| Columns | Returns the number of columns in a reference | Returns the number of columns in a reference |
| Areas | | |
| RandBinomial | Random number generating function. | |

*Fig. 3A*

| | | |
|---|---|---|
| RandCumulative | Random number generating function. | |
| RandDiscrete | Random number generating function. | |
| RandExponential | Random number generating function. | |
| RandInt | Random number generating function. | |
| RandNormal | Random number generating function. | |
| RandPoisson | Random number generating function. | |
| RandTriang | Random number generating function. | |
| RandUniform | Random number generating function. | |
| RandBeta | Random number generating function. | |
| RandChiSquared | Random number generating function. | |
| RandGeometric | Random number generating function. | |
| RandHypergeometric | Random number generating function. | |
| RandLogNormal | Random number generating function. | |
| RandNegBinomial | Random number generating function. | |
| RandBernoulli | Random number generating function. | |

*Fig. 3B*

METHOD, SYSTEM, AND COMPUTER-READABLE MEDIUM FOR CONTROLLING THE CALCULATION OF VOLATILE FUNCTIONS IN A SPREADSHEET

BACKGROUND OF THE INVENTION

When building workbooks, users of spreadsheet application programs often utilize a number of functions for performing calculations in a spreadsheet. A class of functions that is often included in spreadsheets is volatile functions. Volatile functions are a class of functions that are recalculated whenever a calculation is performed on a spreadsheet because the return value of the function might change. For instance, the volatile function "Now( )" returns the current date and time based on a computer's clock and calendar functions. Thus, whenever a workbook is recalculated, if the scope of the calculation request covers a cell that contains the "Now( )" function, the function must be recalculated.

In order for other users to access the contents of multiple spreadsheets in a workbook, copies of the workbook or portions of it may be made. For instance, a workbook may be stored on a file server where multiple users can access the contents of the workbook on connected computers in a computer network. Users accessing a workbook copy from a server are then presented with any volatile functions in spreadsheets which will need to be recalculated on the networked computers.

Traditional methods of handling volatile functions in workbooks suffer from a number of drawbacks. First, spreadsheets in workbooks typically rely on a dependency chain in order to determine what needs to be calculated and in what order those calculations occur. The existence of volatile functions in a spreadsheet, however, not only requires that all volatile functions be calculated when a calculation request on the spreadsheet is made, but also requires all functions dependent on the outcome of such functions to be recalculated as well. As a result, the combination of volatile functions and their dependencies may result in the occurrence of many processing or calculation cycles in a workbook. For instance, if a cell A1 in a spreadsheet contains the "Now( )" function as a formula and another cell A2 has its value set to "=A1," the volatile function would have to be calculated for both cells A1 and A2 in the spreadsheet. Another drawback concerning volatile functions may occur in network environments where the calculation and memory resources of a server may need to be shared by multiple users across multiple spreadsheets and thus, in many cases, may be considered scarce. Thus, the calculation and recalculation of volatile functions in these environments further strain these limited resources.

It is with respect to these considerations and others that the various embodiments of the present invention have been made.

BRIEF SUMMARY OF THE INVENTION

In accordance with the present invention, the above and other problems are solved by a method, system, and computer-readable medium for controlling the calculation of a volatile function in a workbook created in a spreadsheet application program such that the volatile function does not need to be recalculated each time a calculation request is received in the workbook. According to one aspect of the invention, a method includes determining a calculation mode setting for the workbook, calculating a volatile function timeout value based on the calculation mode setting, and calculating the volatile function based on the volatile function timeout value. The volatile function may include a function which is capable of returning a different value each time the function is calculated. The volatile function timeout value may include a time span for which the results of a volatile function are valid. During the volatile function timeout period, the volatile functions are not recalculated.

In calculating a volatile function timeout value based on the calculation mode setting, the method may further include determining that the calculation mode setting is automatic, in response to determining that the calculation mode setting is automatic, retrieving a Server AutomaticVolatileFunctionCache Lifetime setting for the volatile function from a server computer, retrieving a workbook volatile function time out setting for the volatile function from the workbook, and calculating the volatile function timeout value using the relationship: volatile function timeout value=Maximum(workbook volatile function timeout setting, Server AutomaticVolatileFunctionCache Lifetime). When the calculation mode setting is automatic, functions dependent on the volatile function are recalculated when the volatile function is calculated.

Alternatively, in calculating a volatile function timeout value based on the calculation mode setting the method may further include determining that the calculation mode is setting is manual, in response to determining that the calculation mode setting is manual, retrieving a Server ManualVolatileFunctionCache Lifetime setting for the volatile function from a server computer, retrieving a workbook volatile function time out setting for the volatile function from the workbook, and calculating the volatile function timeout value using the relationship: volatile function timeout value=Maximum(workbook volatile function timeout setting, Server ManualVolatileFunctionCache Lifetime). When the calculation mode setting is manual, the volatile function is recalculated in response to a user input.

Other aspects of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIGS. 3A-3B show a table of volatile functions which may be utilized and provided by the various embodiments of the invention.

DETAILED DESCRIPTION OF THE INVENTION

Figure 1:
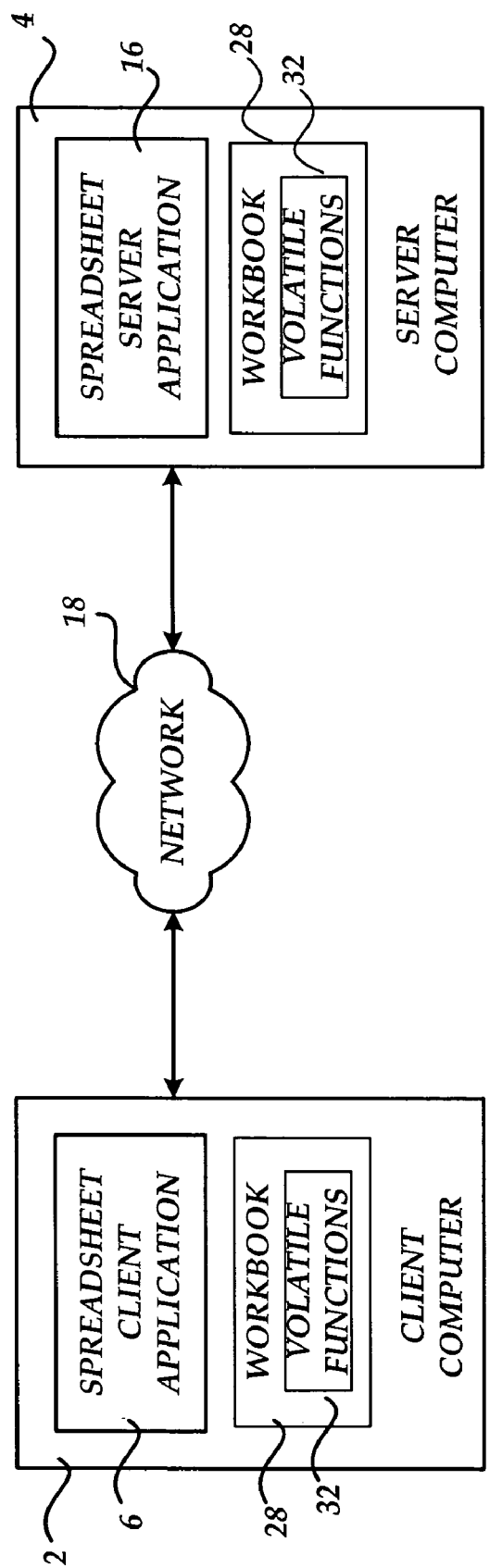
FIG. 1 is a computer network diagram illustrating aspects of several computer systems utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the several embodiments of the invention will be described. As shown in FIG. 1, a network 18 interconnects a client computer 2 and a server computer 4. It should be appreciated that the network 18 may comprise any type of computing network, including a local area network or a wide area network, such as the Internet. The network 18 provides a medium for enabling communication between the client computer 2, the server computer 4, and potentially other computer systems connected to or accessible through the network 18.

The client computer 2 comprises a general purpose desktop or laptop computer capable of executing one or more application programs. In particular, according to the various embodiments of the invention, the computer 2 is operative to execute a spreadsheet client application 6. As known to those skilled in the art, the spreadsheet client application program 6 provides functionality for performing a number of numeric-related tasks. In order to provide this functionality, data values may be organized using cells and the relationships between the cells may be defined using formulas which may include various mathematical functions. A change to one cell produces changes to related cells. Spreadsheet programs usually provide graphing capabilities for output and a variety of formatting options for text, numeric values, and graph features.

According to embodiments of the invention, the spreadsheet client application 6 may be utilized to create a workbook 12. The workbook 12 is a file that is created by a spreadsheet program that contains one or more worksheets (a worksheet may also be referred to herein as a ("spreadsheet"). A worksheet is a single page organized into rows and columns within the spreadsheet program and appearing on screen and used for constructing a single table.

Worksheets within the workbook 28 may include one or more cells that are dependent on volatile functions 32. As defined herein, a volatile function is mathematical function which is capable of returning a different value (i.e., a return value) each time the function is recalculated. Volatile functions require recalculation whenever they are included in the scope of a calculation request in a workbook. As will be described more fully herein, the workbook 28 containing the volatile functions 32 may be stored and made available on the server computer 4 to be shared with the client computer 2.

It should be appreciated that, according to one embodiment of the invention, the spreadsheet client application 6 comprises the EXCEL spreadsheet application program from MICROSOFT CORPORATION of Redmond, Wash. It should be appreciated, however, that the various aspects of the invention described herein may be utilized with other spreadsheet application programs from other manufacturers. Moreover, although the inventive aspects described herein are presented in the context of a spreadsheet application program, it should be appreciated that other types of application programs may also be utilized to embody the various aspects of the invention.

The spreadsheet server application 16 comprises a server-based application program that may execute without the use of a display screen (headless). The spreadsheet server application 16 is operative to perform many of the functions of the spreadsheet client application 6 on the server computer 4. For instance, the spreadsheet server application 16 can load and calculate volatile functions in the workbook 28. As will be described herein, the spreadsheet server application 16 also provides functionality for timeout value for volatile functions. The volatile function timeout value may include a time span for which the results of a volatile function are valid and are not recalculated. Additional details regarding the various functions performed by the spreadsheet client application 6 and the spreadsheet server application 16 will be provided below with respect to FIGS. 2-4.

Figure 2:
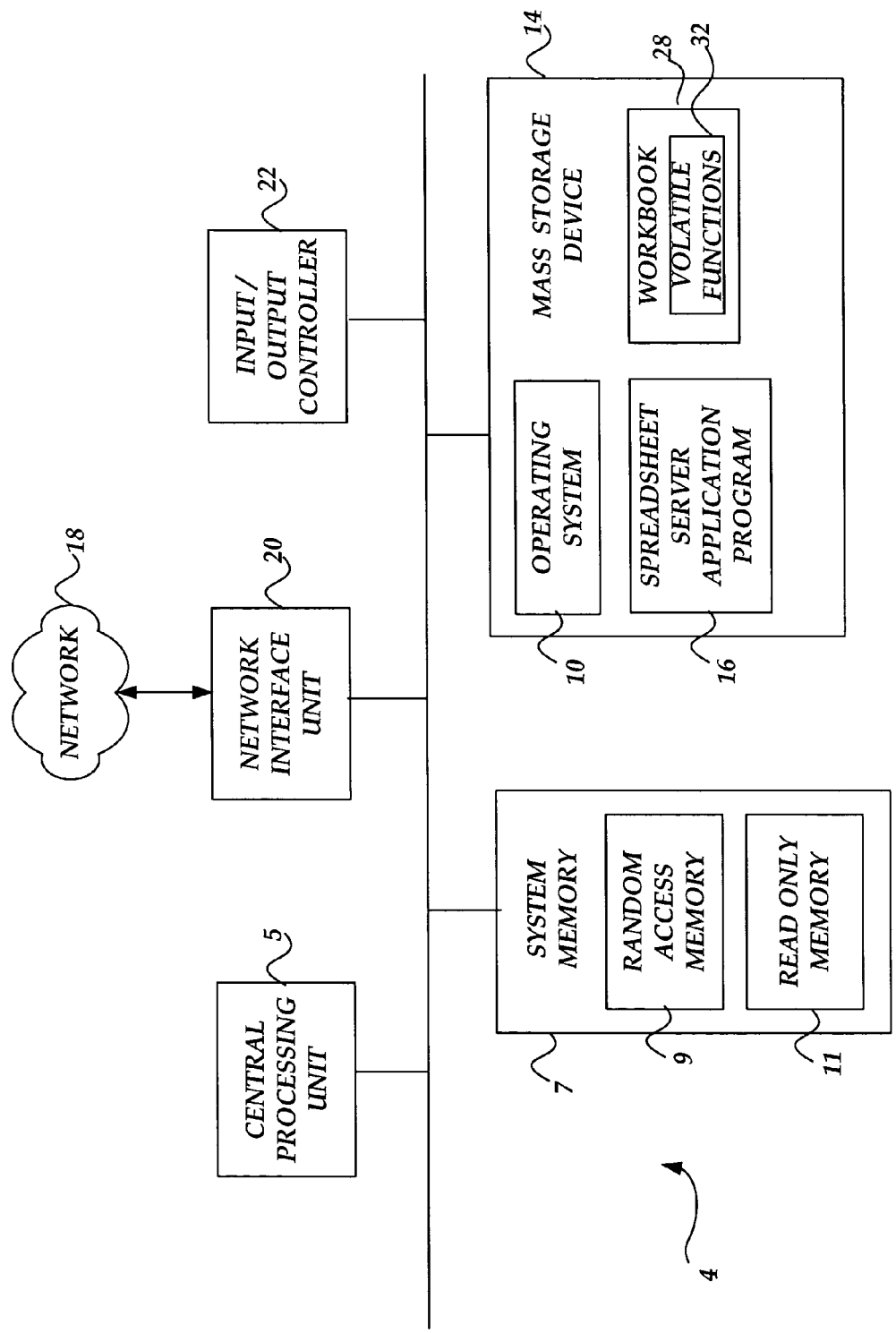
FIG. 2 is a computer system architecture diagram illustrating aspects of a server computer system utilized in and provided by the various embodiments of the invention.

Referring now to FIG. 2, an illustrative computer architecture for a computer 4 utilized in the various embodiments of the invention will be described. The computer architecture shown in FIG. 1 illustrates a conventional server computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 4 further includes a mass storage device 14 for storing an operating system 10, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 4.

According to various embodiments of the invention, the computer 4 may operate in a networked environment using logical connections to remote computers through a network 18, such as the Internet. The computer 4 may connect to the network 18 through a network interface unit 20 connected to the bus 12. It should be appreciated that the network interface unit 20 may also be utilized to connect to other types of networks and remote computer systems. The computer 4 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 4, including an operating system 10 suitable for controlling the operation of a networked personal computer, such as the WINDOWS XP operating system from MICROSOFT CORPORATION of Redmond, Wash. Additionally, the mass storage device 14 and the RAM 9 may store the spreadsheet server application 16 and the workbook 28 created by the spreadsheet server application 16, as described above. It should be appreciated that the client computer 2 may include many of the conventional computing components illustrated in FIG. 2 and described above.

According to an illustrative embodiment of the invention, the spreadsheet server application 16 also includes settings which enable an administrator of the server 4 to control the calculation of volatile functions in a workbook. The server settings include an "AutomaticVoaltileFunctionCacheLifetime" setting and a "ManualVolatileFunctionCacheLifetime" setting.

The AutomaticVolatileFunctionCacheLifetime setting is a positive integer value which represents the number of seconds for which the results of a volatile function are valid. It will be appreciated that if the setting is −1, then the volatile functions in a workbook will only be calculated once. This setting is applied to workbooks saved on the server 4 with a calculation mode set to "automatic." When the calculation mode is set to automatic in a workbook, any time a function value changes due to a recalculation, all functions that are dependent on that function are recalculated as well.

The ManualVolatileFunctionCacheLifetime setting is similar to the AutomaticVolatileFunctionCacheLifetime setting which is a positive integer value which represents the number of seconds for which the results of a volatile function are valid. The ManualVolatileFunctionCacheLifetime setting, however, applies to workbooks saved on the server 4 with a calculation mode set to "manual." When the calculation mode is set to manual in a workbook, the workbook is only recalculated upon receiving instructions from a user.

It will further be appreciated that workbooks created by the spreadsheet server application 16 (or the spreadsheet client application 6) may also include timeout settings representing a time period for which the results of a volatile function are valid. For instance, the workbook 28 on the client computer 2 may be saved with its own volatile function timeout setting. When the workbook 28 is opened on the client computer 2, the timeout value for the volatile functions 32 will be the value of the timeout setting stored in the workbook. However, if the workbook 28 is opened on the server computer 2, the spreadsheet server application 16 employs an algorithm for determining between the administratively set timeout settings (i.e., the AutomaticVoaltileFunctionCacheLifetime and the ManualVolatileFunctionCacheLifetime settings) and the workbook timeout settings since the values for these settings may not always be the same. A process for determining from among the aforementioned settings will be described in greater detail below with respect to FIG. 4.

Referring now to FIGS. 3A-3B, a table of commonly used volatile functions and their return values on both the client computer 2 and the server computer 4 is shown in accordance with the various embodiments of the invention.

Figure 4:
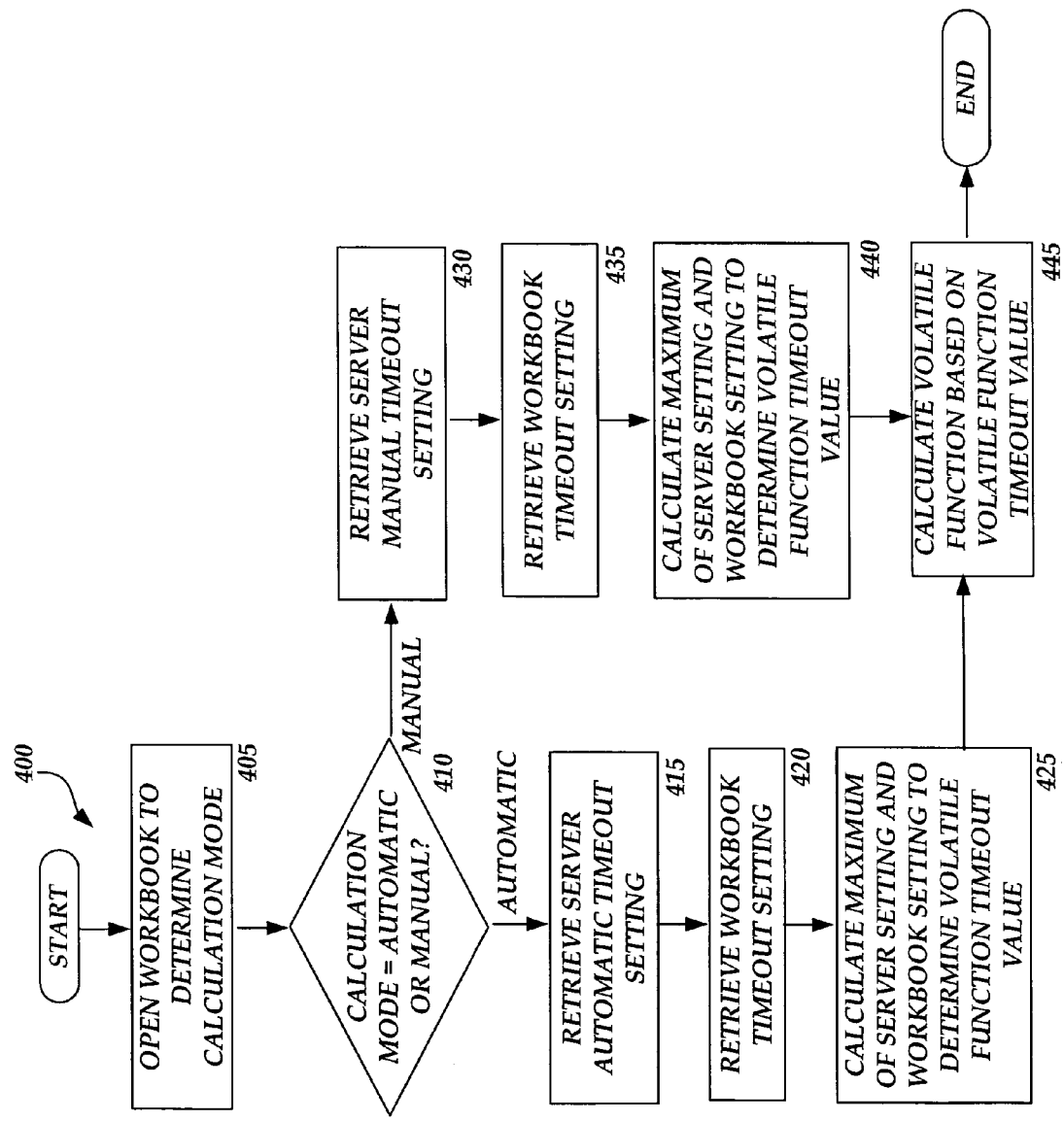
FIG. 4 is a flow diagram illustrating aspects of a process for controlling the behavior of volatile functions in a workbook in a client-server computer network, according to an illustrative embodiment of the invention.

Referring now to FIG. 4, an illustrative routine 400 will be described illustrating a process performed by the spreadsheet server application 4 for controlling the behavior of volatile functions in a workbook in a client-server computer network. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 4, the routine 400 begins at operation 405, wherein the server spreadsheet application 16 opens a workbook to determine a current calculation mode setting. In particular, upon opening the workbook, the server spreadsheet application 16 determines whether the calculation mode setting is set to automatic or manual. As discussed above in the discussion of FIG. 2, workbooks may be saved to the server computer 4 with a calculation mode setting for calculating functions contained in the workbook. As discussed above, an automatic calculation mode setting indicates that as a function value changes in a workbook as a result of recalculation, all functions dependent on that function are recalculated as well. Conversely, a manual calculation mode setting indicates that workbook functions are only recalculated in response to a user input.

The routine 400 continues to operation 410 where the server spreadsheet application 16 determines the calculation mode setting for the workbook opened in operation 405. If, at operation 410, the calculation mode setting is determined to be "automatic," then the routine 400 continues from operation 410 to operation 415.

At operation 415, the server spreadsheet application 16 retrieves a server automatic timeout setting for volatile functions which may be present in the opened workbook. In particular, the server spreadsheet application 16 retrieves the value of the AutomaticVolatileFunctionCacheLifetime setting on the server previously set by an administrator to control the calculation of volatile functions. As discussed above, the AutomaticVolatileFunctionCacheLifetime setting is a positive integer value which represents the number of seconds for which the results returned by a volatile function are valid.

The routine 400 continues from operation 415 to operation 420 where the server spreadsheet application 16 retrieves a workbook timeout setting from the opened workbook. As discussed above with respect to FIG. 2, workbooks may be saved with individual timeout settings for calculating volatile functions. It will be appreciated that this setting may also represent the timeout setting for the volatile function if the workbook is opened on a client computer in a network.

The routine 400 continues from operation 420 to operation 425 where the server spreadsheet application 16 calculates the maximum of the server automatic timeout setting and the workbook timeout setting to determine a volatile function timeout value for the workbook. In particular, the volatile function timeout value may be determined using the relationship: volatile function timeout value=Maximum(workbook volatile function timeout setting, Server AutomaticVolatileFunctionCacheLifetime).

For instance, if the workbook timeout setting for volatile functions is 60 seconds and the AutomaticVolatileFunctionCacheLifetime setting is 300 seconds, then the volatile function timeout value for volatile functions in the workbook (and other functions or cells dependent on the volatile function) will be 300 seconds. As a result, function return values for volatile functions in the workbook will be valid for 300 seconds before being subject to recalculation.

Returning now to operation 410, if the calculation mode setting is determined to be "manual," then the routine 400 branches to operation 430. At operation 430, the server spreadsheet application 16 retrieves a server manual timeout setting for volatile functions which may be present in the opened workbook. In particular, the server spreadsheet application 16 retrieves the value of the ManualVolatileFunctionCacheLifetime setting on the server previously set by an administrator to control the calculation of volatile functions. As discussed above, the ManualVolatileFunctionCacheLifetime setting is a positive integer value which represents the number of seconds for which the results returned by a volatile function are valid after a user requests a workbook to calculate a volatile function.

The routine 400 continues from operation 430 to operation 435 where the server spreadsheet application 16 retrieves a workbook timeout setting from the opened workbook. The routine 400 continues from operation 435 to operation 440 where the server spreadsheet application 16 calculates the maximum of the server manual timeout setting and the workbook timeout setting to determine a volatile function timeout value for the workbook. In particular, the volatile function timeout value may be determined using the relationship: volatile function timeout value=Maximum(workbook volatile function timeout setting, Server ManualVolatileFunctionCacheLifetime).

The routine 400 then continues from operation 425 and operation 440 to operation 445 where the server spreadsheet application 16 calculates volatile functions in the worksheet based on the volatile function timeout value. As discussed above, if the volatile function time out value is −1, then the volatile functions in the workbook will only be calculated once. The routine 400 then ends.

It should be understood that the above operations occur automatically whenever a workbook is requested on the server computer 4 and that upon opening the workbook on the server any previous values of volatile functions are valid for the duration of the volatile function timeout. For instance, if the most recently calculated return value for a "TODAY( )" volatile function in a workbook prior to being opened on the server is Tuesday, then when the workbook is opened in a server spreadsheet application, the previously calculated return value may be displayed in the workbook for 300 seconds before being recalculated. It will be appreciated that the various embodiments of the invention enable server resources for calculating volatile functions in workbooks to be conserved by setting large timeout values for volatile functions having return values which do not frequently change and which do not need to be constantly recalculated. It will further be appreciated that in the various embodiments of the invention, timeout values may be set to balance available resources with a results tolerance level for a given user. For instance, in many cases there may be an acceptable tolerance level for which if the calculated value for a volatile function is not calculated, a user may find either return value (i.e., the uncalculated value or the recalculated value) of the function to be acceptable.

Based on the foregoing, it should be appreciated that the various embodiments of the invention include a method, system, and computer-readable medium for merging data from multiple data sources for use in an electronic document. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for controlling the calculation of a volatile function in a workbook created in a spreadsheet application program, comprising: determining a calculation mode setting for the workbook; calculating a volatile function timeout value based on the calculation mode setting; wherein the volatile function timeout value is a period of time for which a result returned by the volatile function remains valid; and calculating the volatile function when the result that is returned by the volatile function is no longer valid as determined by an expiration of the volatile function timeout value.

2. The method of claim 1, wherein calculating a volatile function timeout value based on the calculation mode setting comprises: determining that the calculation mode setting is automatic; in response to determining that the calculation mode setting is automatic, retrieving a Server AutomaticVolatileFunctionCache Lifetime setting for the volatile function from a server computer; retrieving a workbook volatile function time out setting for the volatile function from the workbook; and calculating the volatile function timeout value using the relationship: volatile function timeout value=Maximum(workbook volatile function timeout setting, Server AutomaticVolatileFunctionCache Lifetime).

3. The method of claim 1, wherein calculating a volatile function timeout value based on the calculation mode setting comprises: determining that the calculation mode is setting is manual; in response to determining that the calculation mode setting is manual, retrieving a Server Manual VolatileFunctionCache Lifetime setting for the volatile function from a server computer; retrieving a workbook volatile function time out setting for the volatile function from the workbook; and calculating the volatile function timeout value using the relationship: volatile function timeout value=Maximum(workbook volatile function timeout setting, Server Manual VolatileFunctionCache Lifetime).

4. The method of claim 2, wherein when the calculation mode setting is automatic, functions dependent on the volatile function are recalculated when the volatile function is calculated.

5. The method of claim 3, wherein when the calculation mode setting is manual, the volatile function is recalculated in response to a user input.

6. The method of claim 1, wherein the volatile function timeout value is a period of seconds for which the result is valid.

7. The method of claim 1, wherein the volatile function comprises a function which is capable of returning a different value each time the function is calculated.

8. The method of claim 1, wherein calculating the volatile function comprises deriving a return value for the volatile function.

9. A system for controlling the calculation of a volatile function in a workbook, comprising: a client computer operative to execute a spreadsheet application program for authoring a workbook having a volatile function, the spreadsheet application program further operative to publish the workbook to a server computer; and a server computer operative to execute a server program for determining a calculation mode setting for the workbook, calculating a volatile function timeout value based on the calculation mode setting, wherein the volatile function timeout value is a period of time for which a result returned by the volatile function remains valid; and calculating the volatile function when the result that is returned by the volatile function is no longer valid as determined by an expiration of the volatile function timeout value.

10. The system of claim 9, wherein calculating a volatile function timeout value based on the calculation mode setting comprises: determining that the calculation mode setting is automatic; in response to determining that the calculation mode setting is automatic, retrieving a Server AutomaticVolatileFunctionCache Lifetime setting for the volatile function; retrieving a workbook volatile function time out setting for the volatile function from the workbook; and calculating the volatile function timeout value using the relationship: volatile function timeout value=Maximum(workbook volatile function timeout setting, Server AutomaticVolatileFunctionCache Lifetime).

11. The system of claim 9, wherein calculating a volatile function timeout value based on the calculation mode setting comprises: determining that the calculation mode is setting is manual; in response to determining that the calculation mode setting is manual, retrieving a Server Manual VolatileFunctionCache Lifetime setting for the volatile function from a server computer; retrieving a workbook volatile function time out setting for the volatile function from the workbook; and calculating the volatile function timeout value using the relationship: volatile function timeout value=Maximum(workbook volatile function timeout setting, Server Manual VolatileFunctionCache Lifetime).

12. The system of claim 10, wherein when the calculation mode setting is automatic, functions dependent on the volatile function are recalculated when the volatile function is calculated.

13. The system of claim 11, wherein when the calculation mode setting is manual, the volatile function is recalculated in response to a user input.

14. The system of claim 9, wherein the volatile function timeout value comprises a number of seconds for which the results of a volatile function are valid.

15. The system of claim 9, wherein the volatile function comprises a function which is capable of returning a different value each time the function is calculated.

16. The system of claim 9, wherein calculating the volatile function comprises deriving a return value for the volatile function.

17. A computer-readable storage medium having computer-executable instructions stored thereon which, when executed by a computer, will cause the computer to perform a method for controlling the calculation of a volatile function in a workbook created in a spreadsheet application program, comprising: determining a calculation mode setting for the workbook; calculating a volatile function timeout value based on the calculation mode setting; wherein the volatile function timeout value is a period of time for which a result returned by the volatile function remains valid and calculating the volatile function when the result that is returned by the volatile function is no longer valid as determined by an expiration of the volatile function timeout value.

18. The computer-readable storage medium of claim 17, wherein calculating a volatile function timeout value based on the calculation mode setting comprises: determining that the calculation mode setting is automatic; in response to determining that the calculation mode setting is automatic, retrieving a Server AutomaticVolatileFunctionCache Lifetime setting for the volatile function from a server computer; retrieving a workbook volatile function time out setting for the volatile function from the workbook; and calculating the volatile function timeout value using the relationship: volatile function timeout value=Maximum(workbook volatile function timeout setting, Server AutomaticVolatileFunctionCache Lifetime).

19. The computer-readable storage medium of claim 17, wherein calculating a volatile function timeout value based on the calculation mode setting comprises: determining that the calculation mode is setting is manual; in response to determining that the calculation mode setting is manual, retrieving a Server Manual VolatileFunctionCache Lifetime setting for the volatile function from a server computer; retrieving a workbook volatile function time out setting for the volatile function from the workbook; and calculating the volatile function timeout value using the relationship: volatile function timeout value=Maximum(workbook volatile function timeout setting, Server Manual VolatileFunctionCache Lifetime).

20. The computer-readable storage medium of claim 17, wherein the volatile function timeout value is a number of seconds to not calculate the volatile function.

* * * * *